April 2, 1957 K. G. MACLEISH 2,787,737
ELECTROMAGNET REGULATOR
Filed May 26, 1947
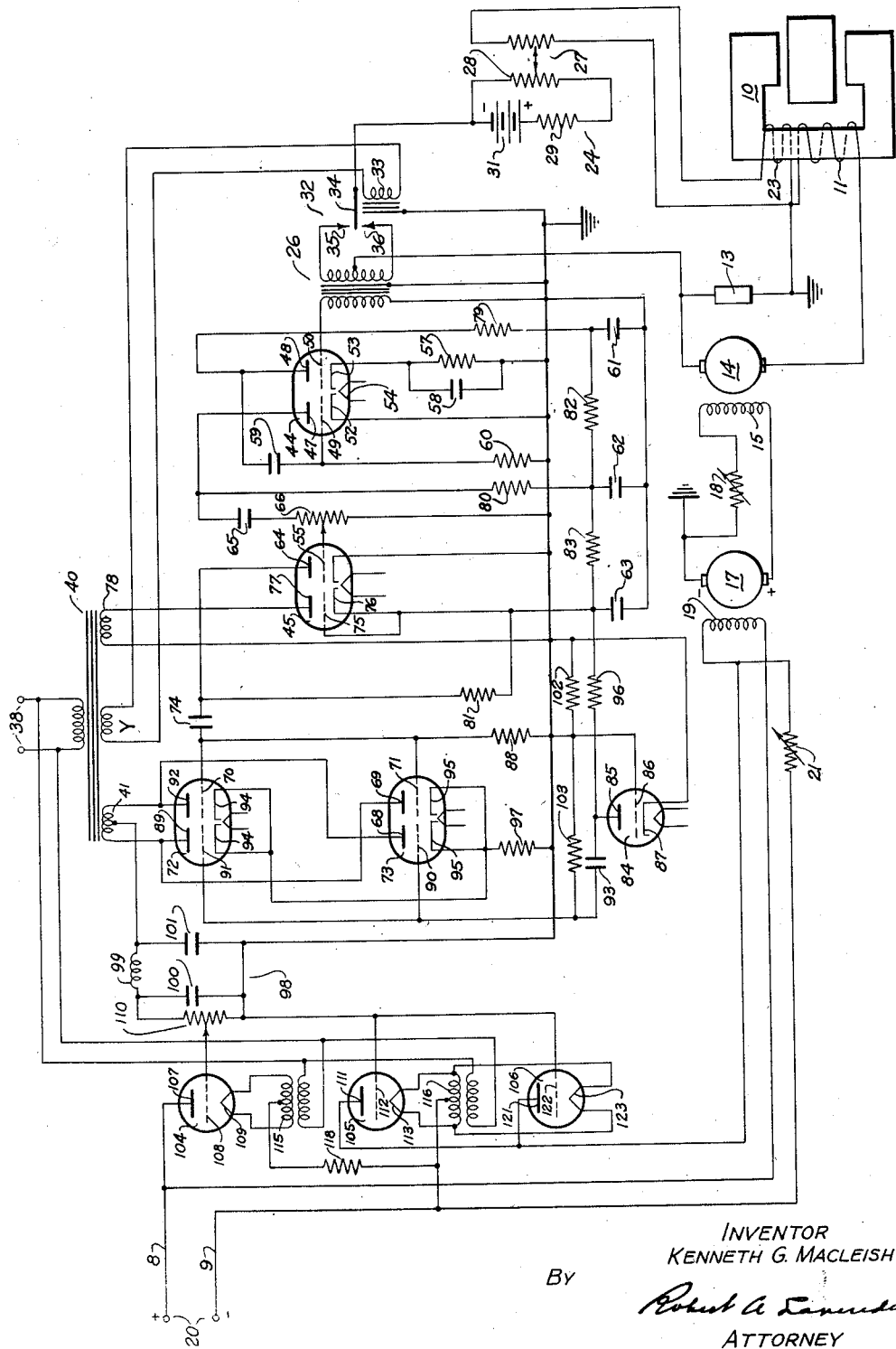
INVENTOR
KENNETH G. MACLEISH
BY
ATTORNEY United States Patent Office 2,787,737
Patented Apr. 2, 1957

2,787,737

ELECTROMAGNET REGULATOR

Kenneth G. Macleish, Rochester, N. Y., assignor to the United States of America as represented by the United States Atomic Energy Commission Application May 26, 1947, Serial No. 750,595

3 Claims. (Cl. 317—123)

This invention relates to electromagnet current regulators but more particularly to certain improvements in electromagnet current regulators of the type in which the current supplied to the magnet windings is controlled or regulated to maintain a substantially constant magnetic field.

In the art of isotopic separation of an element by electromagnetic methods, the magnetic field strength must be controlled so as to keep variations in the field strength to a value of the order of one part in approximately 5000 in order to achieve exact focusing of the orbit of the electron beam.

Electromagnetic separation of isotopes has been fully set forth and described in the specification of U. S. Patent No. 2,709,222 issued to Ernest O. Lawrence, on May 24, 1955, and an electromagnet current regulator utilized for the aforementioned purpose has been described in U. S. Patent No. 2,468,678, issued April 26, 1949, to Kenneth R. MacKenzie.

The electromagnet regulator referred to in the above mentioned MacKenzie patent incorporates a galvanometer photoelectric cell in the regulating circuit with means for feeding the direct current signal thus obtained to an amplifying vacuum tube system and both of these are used in conjunction with an auxiliary winding around the magnet yoke, by which means fluctuations in the magnet field strength are registered on the galvanometer, together with means for utilizing this amplified signal to regulate current applied to the generator supplying current to the magnet windings.

Whereas the above mentioned MacKenzie regulator was limited to the use of direct current in its amplifying system which condition involved stability problems in relation to an amplification of direct current by vacuum tubes, this improved regulator is designed for the use of an alternating current amplification unit thereby eliminating difficulties inherent in previous regulators.

The instant invention relates to an improved electromagnet regulator comprising a magnet to be energized; a generator, either self excited or externally excited, for energizing the magnet through a shunt resistor; or in combination, a shunt resistor and a damping circuit for feeding a direct current input signal to a standard current converter for converting the direct current input signal to a modified square wave alternating current; means for amplifying and rectifying the input signal and applying same to a plurality of control vacuum tubes connected in series with the generator or to the generator field for regulating the current flowing to the generator and by this means regulating the magnetic field.

Therefore, it is an object of this invention to provide an improved electromagnet regulator which will provide a minimum variation of the magnetic flux between the pole pieces of a magnet.

Another object of this invention is to provide an improved electromagnet regulator which will provide a minimum variation of the magnetic flux between the pole pieces of a magnet by maintaining substantially constant the current to the windings of said magnet.

It is a further object of this invention to provide an improved electromagnet regulator in which an alternating current amplification unit is used.

A further object of this invention is to provide an improved electromagnet regulator in which the direct current signal is converted to an alternating current form before being amplified and is then subsequently rectified and used for control purposes.

A further object of this invention is to provide an improved electromagnet regulator adapted to control sudden or large fluctuations in the magnet field strength without a resultant oscillatory action about the normal operating point.

Further objects and advantages of this invention will be apparent from the following specifications and accompanying drawing in which the sole figure shows a preferred embodiment of the apparatus suitable for carrying out the invention and including the electrical circuit and components of the improved electromagnet regulator.

Considering the drawing in general it may be noted that a generator 14, a shunt resistor 13, and magnet windings 11 are connected in series. A voltage comparison network 24 compares the signal developed across the shunt resistor to a standard voltage from a battery 31, and a mechanical vibrator 32 converts the result of said comparison to an alternating current signal. An amplifier unit composed of two twin triode vacuum tubes 44 and 45 amplifies the signal and a rectifier unit utilizing another pair of twin triode vacuum tubes 72 and 73 as rectifiers and a triode vacuum tube 84 as a phase inverter return the signal to a direct current form. An output unit shown as three triode vacuum tubes 104, 105 and 106, one acting as a driver stage and two as output stages, are connected in parallel with a field resistor 21 in the power supply for the field of an exciter 17, said exciter energizing the field of the main generator.

Now considering the drawing in more detail, it may be noted that a magnet 10 is energized by winding 11 connected in series with a shunt resistor 13 and a main generator 14, said generator having a shunt field 15 energized by an exciter 17 through a variable field resistance 18. The exciter 17 has a shunt field 19 which is energized from an external direct current source 20 through a variable resistance 21. The shunt resistor 13, as well as being in series with the magnet windings 11, is connected to an auxiliary loop winding 23 around the magnet 10 and through this loop winding 23 to a standard voltage comparison network generally designated 24. The other side of the shunt resistor 13, in addition to being connected to the main generator 14, is connected to the center tap of the primary winding of an input transformer 26. The standard voltage comparison network 24 consists of potentiometers 27 and 28, resistance 29 and battery 31 by means of which a desired measure of the voltage drop across the shunt resistor 13 is compared to standard voltage from the battery 31. The resultant difference voltage from the standard voltage comparison network 24 is impressed on a mechanical vibrator 32, hereafter referred to as a converter, which has its magnet winding 33 energized from an external regulated alternating current supply 38 through the secondary windings Y of transformer 40. The center tap 34 of the converter 32 is connected to the negative terminal of the battery 31 and the points 35 and 36 are connected to the primary winding of the input transformer 26. This circuit including shunt resistor 13, standard voltage comparison network 24, converter 32 and input transformer 26 provides a modulated square wave signal for the regulator amplifier stages.

The A. C. signal from the input transformer 26 is amplified by a number of impedance coupled vacuum tubes shown in this case as two twin triodes 44 and 45. The filament of each of these tubes is heated by an external A. C. power source 38 through the secondary winding Y of transformer 40. Vacuum tube 44 contains plates 47 and 48, grids 49 and 50, cathodes 52 and 53 and filament 54. The cathode 53 is grid biased by resistor 57 which is by-passed by condenser 58. The input signal is applied to the grid 50, amplified and applied through condenser 59 to grid 49 which is grounded through grid leak resistor 60. The output of the second half of amplifier tube 44 is applied through condenser 65 and variable resistor 66 to the grid 55 of vacuum tube 45. Resistor 66 is grounded thereby causing the part of said resistor between the adjustable contact and ground to act as a grid leak resistor. Plate 64 is connected to the grids 70 and 71 of twin diodes 72 and 73 through condenser 74. The left triode part of tube 45 acts as a voltage rectifier supplying plate potential to plates 47, 48 and 64 of the amplifier tubes. Said triode part has its plate 77 connected to the high side of the secondary winding 78 of transformer 40 and its grid 75 and filament 76 tied together and connected to a circuit comprising resistances 79, 80, 81, 82 and 83, and condensers 61, 62, 63, said circuit filtering the output of said rectifier tube and applying the correct potential to the amplifier tubes.

Vacuum tube 84, having plate 85, grid 86 and cathode 87 acts as a phase inverter, the input signal being applied to its grid 86 from the plate 64 of amplifier tube 45 through condenser 74 and resistor 88. The output of phase inverter 84 is applied to grids 91 and 90 of rectifiers 72 and 73 respectively through condenser 93. The plate potential of tube 84 is maintained by a resistor 96 connected to the plate supply circuit for tubes 44 and 45. A negative feedback voltage developed across a resistor 102 between grid 86 and ground and supplied from the plate circuit through resistor 103, is applied to the input circuit of the phase inverter 84 thereby stabilizing its operation.

Plates 89 and 69 of twin triode tubes 72 and 73 respectively are connected as are plates 92 and 68 of these same tubes, thus aligning these tubes in push pull. As one of the grids of each tube is supplied with a voltage 180° out of phase with the voltage applied to the other grid, the output of the rectifier tubes 72 and 73 is a pulsating D. C. voltage which is applied across plate transformer 41.

Vacuum tubes 72 and 73 are of necessity in synchronism with the magnet windings 33 of the converter 32 in order for the rectifier output to increase with an increased signal from the converter 32 (an opposite phasing would result in an inverse relationship). The cathodes 94 and 95 of the rectifier tubes 72 and 73 are connected and grounded through biasing resistor 97.

The output of rectifier tubes 72 and 73 is passed through a π section filter, generally designated 98, composed of a choke coil 99 and condensers 100 and 101, thereby decreasing fluctuations in the D. C. output. The exciter 17 has its field 19 energized by positive and negative leads 8 and 9 respectively from an external D. C. source 20 through a variable field resistance 21, and the output stage of the regulator, representing a variable impedance, is connected across said field resistance 21. The output stage of the regulator consists, in this case, of three vacuum tubes 104, 105 and 106 with tube 104 acting as a driver stage. The filtered D. C. signal from rectifier tubes 72 and 73 is applied to the grid 108 of vacuum tube 104 through a variable resistance 110 the other end of which is grounded thereby providing a grid bias. The plate 107 of tube 104 is connected to the positive lead 8 of the D. C. power supply 20 and the cathode 109 is energized by a filament transformer 115. The plates 111 and 121 of triode vacuum tubes 105 and 106 respectively are connected to each other and to lead 9 on the exciter side of field resistance 21. The cathodes 113 and 123 are energized from a filament transformer 116 connected in parallel with the filament transformer 115 of tube 104. As a low plate potential is maintained on output tubes 105 and 106 it is advantageous to operate these tubes with a positive grid potential, this positive potential being obtained in this case by the use of cathode coupling between the driver 104 and output stages. The grids 112 and 122 are grounded and the center taps of the filament transformers 115 and 116 are connected together through a cathode resistor 118, one end of this circuit being grounded and the other end being connected to the negative line 9 of the D. C. power supply 20 for the exciter field 19. In the above described coupling circuit the current flowing through tube 104 also flows through the cathode resistor 118 thus making the grids of tubes 105 and 106 positive by the amount of the voltage drop through the resistor 118.

The majority of exciter field current flows through the variable field resistance 21, but as the output tubes 105 and 106 in parallel with said resistor comprise a variable impedance, a certain amount of current by-passes field resistor 21. This certain amount of current is dependent upon the impedance of the tubes 105 and 106 which varies with the signal applied by the driver stage and is therefore proportional to the signal supplied the regulator by shunt resistor 13.

By means of a transformer connected in the magnet line a voltage can be introduced in series with the shunt voltage to eliminate any one of the time constants inherent in the system. In the drawing a loop around the magnet 23 acts as the secondary of such a damping transformer. By use of this damping transformer a higher amplification may be used without sustained oscillations and a greater damping of transient oscillations is obtained. In the event an even higher amplification is desired additional damping transformers may be used to cancel other time constants in the system.

The signal appearing across the shunt resistor 13 is quite small, of the order of a few microvolts, so that it is quite important that stray pickup and power hum voltages be minimized. For this reason it is advisable for the A. C. power supply 38 to be regulated and well filtered as the magnet regulator would tend to correct for any voltage variations on said power supply. As an added precaution the power supply transformers are insulated from the magnet regulator proper and all leads are twisted and shielded.

Assuming the system to be energized, the regulator circuit will assume certain conditions of equilibrium consistent with the setting of the controls of the standard voltage comparison network 24. The generator 14 supplies current to the windings 11 of magnet 10 through shunt resistor 13. Any variation of magnet field flux will change the voltage drop across the shunt resistor 13. The voltage drop across shunt resistor 13 is compared to the standard voltage of the standard voltage comparison network 24 thus a variation of said shunt resistor voltage produces a resultant difference voltage from the comparison network 24. The difference voltage is applied to a mechanical converter 32 which changes this D. C. voltage to a modulated square wave voltage. The A. C. output of converter 32 is passed through an input transformer 26 and from there amplified by two twin triodes 44 and 45 and rectified by two twin triodes 72 and 73, the signal for the push pull arrangement of tubes 72 and 73 being supplied by a triode 84 acting as a phase inverter. The pulsating D. C. output of the rectifier stage is passed through a filter 98 and then applied to the grid of a triode vacuum tube 104 used as a driver stage. The driver stage is cathode coupled to the output stage composed of two triode vacuum tubes 105 and 106 which are in parallel with a variable resistor 21 in the D. C. supply for the exciter field 19. Thus the signal applied to the grid 108 of the driver stage 104 will vary the output stage potential thereby varying its impedance. This variable impedance allows an amount of current proportional to the input signal to by-pass the resistor 21 thereby changing the excitation of the exciter field 19 and thus the output of the exciter 17 which in turn controls the main generator field 15 and returns the generator output to normal.

While the above description has described the invention with respect to certain embodiments it will be apparent to those skilled in the art that many modifications are possible within the spirit and scope of the invention therefore the invention is not to be limited to the details shown except as defined in the following claims.

What is claimed is:

1. An electromagnet regulator comprising in combination a generator having control means, a magnet having windings energized by said generator, a resistor connected in series between said generator and magnet windings to sample the current flowing to said magnet windings, said sample being in the form of a voltage differential, a comparison network having a standard voltage source and connected across said resistor for comparing a desired measure of said standard voltage to said sample voltage differential, converter means connected to said comparison network for converting the result of said comparison to an alternating current signal, an alternating current vacuum tube amplifier unit connected to said converter means for changing said alternating current signal into an amplified alternating current signal, a vacuum tube rectifier unit electrically connected to the output of said amplifier for changing said amplified alternating current signal into an amplified and rectified signal, means to impress said amplified and rectified signal on the control means of said generator and an additional winding upon said electromagnet having a voltage induced therein by rapid variations in the magnetic field strength of said electromagnet and being electrically connected to said comparison network in bucking relationship to the voltage differential across said resistor whereby the voltage resulting from said comparison is reduced to compensate for rapid magnetic field fluctuations and oscillation of said regulator is minimized.

2. An electromagnet regulator comprising in combination a generator having field windings energized from a power source, a magnet having windings energized by said generator, a resistor electrically connected in series between said generator and magnet windings thereby producing a potential thereacross proportional to the current to said windings, a comparison network connected across said resistor and having a standard voltage source and means for comparing a desired measure of said standard voltage to said sample voltage differential, means connected to said comparison network and including a mechanical vibrator for converting the result of said comparison to an alternating current signal, an alternating current vacuum tube amplifier unit electrically connected to the output of said converter means for changing said alternating current signal into an amplified alternating current signal, a vacuum tube rectifier unit connected to said amplifier output for changing said amplified alternating current signal into an amplified and rectified signal, a variable impedance connected in series between said generator field windings and said power source, said variable impedance having control means connected to receive said amplified and rectified signal whereby the impedance of said variable impedance and consequently the energization of the said generator supplying said magnet windings is controlled in response to the current to said magnet windings, and an auxiliary magnet winding energized by the field of said magnet and connected to said comparison network in opposite polarity to the said connections from said resistor thereby reducing the effective signal to said comparison network for the condition of rapid magnetic field fluctuations and preventing oscillation of the electromagnet regulator.

3. In a regulator for the control of the magnetic field of an electromagnet having a power source supplying direct current to the windings thereof and having a resistor connected in series with the magnet windings for providing a voltage proportional to the current to said windings, a standard voltage source and a comparison network for comparing the resistor voltage to said standard voltage to produce a regulator signal, control means associated with said power source, and means for converting said regulator signal into an alternating current signal, amplifying said signal, rectifying said amplified signal, and impressing said resultant signal upon the control means of said power source to regulate the output current thereof; the improvement comprising an auxiliary magnet winding connected to said comparison network in opposing electrical polarity to the connections of said resistor to said comparison network whereby the voltage induced in said auxiliary magnet winding opposes the voltage developed across said resistor.

References Cited in the file of this patent

UNITED STATES PATENTS

| | | |
|---|---|---|
| 2,366,577 | Thompson | Jan. 2, 1945 |
| 2,429,466 | Jones | Oct. 21, 1947 |
| 2,468,678 | MacKenzie | Apr. 26, 1949 |